US012783364B2

(12) United States Patent
Eberlein

(10) Patent No.: US 12,783,364 B2
(45) Date of Patent: *Nov. 3, 2026

(54) TENANT-SPECIFIC DISASTER RECOVERY

(71) Applicant: SAP SE, Walldorf (DE)

(72) Inventor: Peter Eberlein, Malsch (DE)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 19/191,358

(22) Filed: Apr. 28, 2025

(65) Prior Publication Data

US 2025/0321835 A1 Oct. 16, 2025

Related U.S. Application Data

(63) Continuation of application No. 18/635,486, filed on Apr. 15, 2024, now Pat. No. 12,287,711.

(51) Int. Cl.
*G06F 11/1446* (2026.01)
*G06F 11/20* (2006.01)

(52) U.S. Cl.
CPC ...... *G06F 11/1469* (2013.01); *G06F 11/2069* (2013.01); *G06F 2201/80* (2013.01)

(58) Field of Classification Search
CPC ............. G06F 11/1469; G06F 11/2069; G06F 2201/80
See application file for complete search history.

(56) References Cited

U.S. PATENT DOCUMENTS 8,706,772 B2 4/2014 Hartig et al.
8,751,573 B2 6/2014 Said et al.
10,983,881 B2 4/2021 Salapura et al.
2019/0370132 A1 12/2019 Salapura et al.
2020/0280592 A1 * 9/2020 Ithal .................... H04L 43/0876

(Continued)

OTHER PUBLICATIONS

Wang et al., "Experiences with building disaster recovery for enterprise-class clouds." 2015 45th Annual IEEE/IFIP International Conference on Dependable Systems and Networks. IEEE, Jun. 2015, 231-238.

(Continued)

*Primary Examiner* — Alicia M Willoughby
(74) *Attorney, Agent, or Firm* — Fish & Richardson P.C.

(57) ABSTRACT

A computer-implemented method includes translating into a routing configuration, tenant-specific preferences for primary and secondary datacenter locations. A service mesh is set up for communication between services within and across the primary and secondary datacenter locations. Service persistencies with endpoints in datacenter locations are used to configure replication agents between the service persistencies. Using service endpoints, configuring Virtual Services that implement the service mesh. An Ingress Gateway is configured to route end user requests into the service mesh to a first service instance in the tenant-selected primary datacenter. According to the tenant-specific preferences, data replication is configured to copy data to redundant storage. Using endpoints of persistent storage replication agents for each service persistence in the tenant-selected primary datacenter, configuring persistent storage replication agents for each service persistence in the tenant-selected primary datacenter.

18 Claims, 4 Drawing Sheets

(56) References Cited

U.S. PATENT DOCUMENTS

| | | | |
|---|---|---|---|
| 2021/0382912 A1 | 12/2021 | Horowitz et al. | |
| 2023/0262030 A1 | 8/2023 | Bansal et al. | |
| 2023/0269137 A1 | 8/2023 | Fehring et al. | |
| 2024/0152378 A1 | 5/2024 | Sadasivan et al. | |
| 2024/0394760 A1* | 11/2024 | Vanbrocklin .......... | G06Q 50/04 |

OTHER PUBLICATIONS

U.S. Appl. No. 17/983,045, Eberlein, Coordinated Shutdown of Cloud Computing Applications with Session Handover, filed Nov. 8, 2022, 42 pages.
U.S. Appl. No. 18/498,674, Eberlein et al., Phased Configuration Changes with Fallback Option, filed Oct. 31, 2023, 48 pages.
U.S. Appl. No. 18/581,914, Eberlein et al., Consistent Restore Across Microservice Persistencies, filed Feb. 20, 2024, 41 pages.

* cited by examiner

TENANT-SPECIFIC DISASTER RECOVERY

CLAIM OF PRIORITY

This application claims priority under 35 USC § 120 to U.S. patent application Ser. No. 18/635,486 filed on Apr. 15, 2024, entitled "TENANT-SPECIFIC DISASTER RECOVERY"; the entire contents of which are hereby incorporated by reference.

BACKGROUND

Disaster recovery is a top priority for cloud-computing customers. Because the customers entrust their data to a cloud-computing environment, an ability to operate depends on the cloud-computing environment to provide continuous access, even under disastrous/adverse circumstances (e.g., earthquakes, floods, fire, and war). Although the probability of such events is small, many customers are willing to pay a premium for replicating their data to multiple datacenters across different regions to be prepared for an extended outage in any one of them. For a heterogeneous customer, replicating data to multiple datacenters can be prohibitively expensive (e.g., due to volume of data, geographical location, hyperscaler strategies, or regulatory restrictions), so the heterogenous customer may simply forego disaster recovery or only choose a subset of their data to protect.

SUMMARY

The present disclosure describes tenant-specific disaster recovery.

In an implementation, a computer-implemented method for tenant specific disaster recovery, comprises: translating, by a Routing Configurator and into a routing configuration, tenant-specific software application solution preferences for primary and secondary datacenter locations; setting up, using the Routing Configurator, a service mesh for communication between services within and across the primary and secondary datacenter locations; configuring, using a Replication Configurator and service persistencies with endpoints in datacenter locations as determined from a Landscape Directory, replication agents between the service persistencies; configuring, using the Routing Configurator and service endpoints read from the Landscape Directory, Virtual Services that implement the service mesh, which is used to route service requests to service deployments in a tenant-selected primary datacenter; configuring, using the Routing Configurator, an Ingress Gateway to route end user requests into the service mesh to a first service instance in the tenant-selected primary datacenter; configuring, using a Replication Configurator and according to the tenant-specific software application solution preferences for primary and secondary datacenter locations, data replication to copy data to redundant storage; and configuring, using the Replication Configurator and endpoints of persistent storage replication agents fetched from the Landscape Directory for each service persistence in the tenant-selected primary datacenter, persistent storage replication agents for each service persistence in the tenant-selected primary datacenter.

The described subject matter can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented to realize one or more of the following advantages.

First, disaster recovery can be configured per application and customer tenant, permitting offering a default configuration with no overhead and no additional cost for customers that do not require this feature, but permitting activation (e.g., at a premium price) for others. Second, each customer can individually choose which datacenter combinations (and hyperscalers) should be used for their unique workload independent of other customers. This enables freedom of choice to accommodate for a customer's strategic preferences (such as, a customer not wanting to host on AMAZON WEB SERVICES or other cloud-computing provider's platform), regulatory requirements (e.g., European Union (EU) access only), and of course location dependencies (e.g., to achieve a lowest latency and fastest response time). Third, described approach permits a cloud-computing provider to build complex microservices-based solutions that leverage deployments to either regional hubs or satellites, decided purely from an operational and cost perspective, without affecting customers' ability to enable disaster recovery.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

Figure 1:
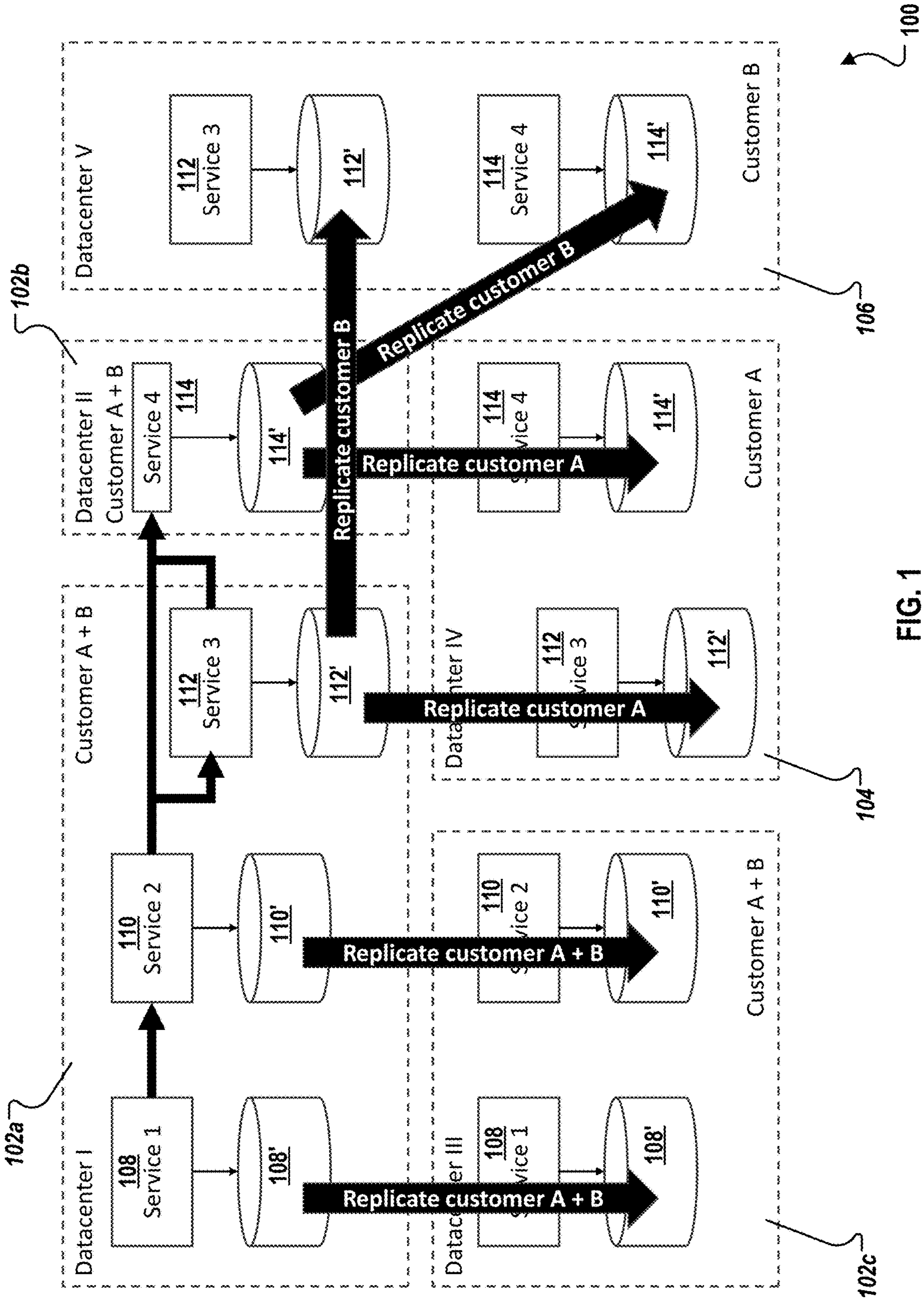
FIG. 1 is a box diagram of an example cloud computing system during normal operation, according to an implementation of the present disclosure.

The following detailed description describes tenant-specific disaster recovery and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

Disaster recovery is a top priority for cloud-computing customers. Because the customers entrust their data to a cloud-computing environment, an ability to operate depends on the cloud-computing environment to provide continuous access, even under disastrous/adverse circumstances (e.g., earthquakes, floods, fire, and war). Although the probability of such events is small, many customers are willing to pay a premium for replicating their data to multiple datacenters across different locations to be prepared for an extended outage in any one of them.

Many cloud-computing customers are heterogeneous in nature. For some, the additional cost to replicate data to multiple datacenters is prohibitive, so alternative solutions are needed that provide limited protection based on multi-availability-zone redundancy, but not multi-region disaster recovery. To reduce additional cost to a minimum, customers that opt-in to disaster recovery protection may also choose just a subset of their solutions to be covered.

Customers can also have different hyperscaler strategies. For some it is acceptable to use different providers for their primary and secondary datacenter locations, while others made a strict single hyperscaler decision.

Additionally, there may be regulatory restrictions that also apply to secondary disaster recovery sites. For example, a regulatory restriction could specify that a secondary disaster recovery site can be European Union (EU) access only.

As a further dimension, there are various regional deployment strategies on a cloud-computing provider side to be considered. Customers can choose their preferred datacenter locations, but a cloud-computing provider may have individual datacenter deployment strategies within each region. As regional hubs and satellite deployments are introduced, applications and consumable services can be spread out across multiple datacenter locations. Deciding on disaster recovery sites for each service in each primary location, replicating data between those different sites, and re-routing data access in case of failover becomes a multi-dimensional problem that needs to be addressed in a controlled manner.

An approach is needed to manage customer data on a tenant-specific level for each service individually and support different replication targets from within each service as needed, while at the same time ensuring consistency and coordinated failover in case a disaster occurs.

The described approach addresses several problems. For example:

1. Disaster recovery must be enabled per application and customer tenant individually, as disaster recovery comes with an additional price tag that is deliberately chosen by some, but not all, customers.
2. Customers need to be able to select their primary and secondary datacenter locations (and hyperscalers) independent of other customers.
3. With distributed services due to a regional hub/satellite deployment strategy, even within one application (e.g., assembled from a number of microservices), data replication and failover is not a simple 1:1 relation of datacenters, but data replication and failover must be configurable on a per service level.
4. Consequently, each service deployment may be the primary, the secondary, or the only (in case disaster recovery is not selected) location, and individually configured for each of the tenants and solutions it hosts.
5. Configuring replication directions during normal operation, switching the directions during an outage (even for not directly affected datacenters due to internal service dependencies), and reconfiguring service bindings and request routings according to customer choices on a per-tenant basis must be possible from one central control plane with a single action for all customers, applications, and services affected by a disaster-recovery-causing event.

FIG. 1 is a box diagram 100 of an example cloud computing system during normal operation, according to an implementation of the present disclosure. Illustrated are Datacenters I-III, 102*a*-102*c*, respectfully, Datacenter IV 104, and Datacenter V 106. In FIG. 1 a software application solution is assembled from four services, labeled Service 1 108, Service 2 110, Service 3 112, and Service 4 114. Each service has a separate multi-tenant persistence, depicted as databases. For the purposed of this disclosure, the separate multi-tenant persistencies are indicated by adding a "'" to the label identifying the particular service (e.g., persistence 108' in Datacenter I 102*a* associated with Service 1 108). In some implementations, multi-tenant persistences can include other data structures. In some implementations, tenant isolation can be implemented as separate database schemas or in other ways, but this is irrelevant for understanding of the presented solution.

There are two customers subscribed to this software application solution, labeled Customer A and Customer B. Consequently, there exist customer tenants for Customer A and Customer B in Services 1 to 4 and their associated persistencies.

The five datacenters are in different geographic regions hosting subsets of the services in a way that each service is deployed to at least two datacenters for redundancy. For example, Service 1 108 is deployed to both Datacenter I 102*a* and Datacenter III 102*c*. Due to the implemented deployment strategy with regional hubs and satellite deployments of services, the complete software application solution cannot be hosted in a single datacenter, but any combination of services will result in a multi-datacenter setup.

The customers need to select a set of datacenters within their preferred regions (either explicitly or transparently to them based on how much detail about the deployment scheme is exposed to customers) for their primary use as well as a secondary set for disaster recovery. Due to individual customer requirements (e.g., regional location (region or location), hyperscaler preferences, or regulatory requirements), the two customers in this example have made different decisions:

Customer A chose Datacenter I 102*a* and Datacenter II 102*b* as primary locations and Datacenter III 102*c* and Datacenter IV 104 as secondary locations.

Customer B also chose Datacenter I 102*a* and Datacenter II 102*b* as primary locations but prefers Datacenter III 102*c* and Datacenter V 106 as secondary locations.

As depicted in FIG. 1, this means, for replicating customer data to prevent data loss in case of a disaster recovery event:

Service 1 108 and Service 2 110 need to replicate data for both Customer A and Customer B from Datacenter I 102*a* to Datacenter III 102*c*.

Service 3 112 needs to replicate data for Customer A from Datacenter I 102*a* to Datacenter IV 104 and for Customer B from Datacenter I 102*a* to datacenter V 106.

Service 4 114 needs to replicate data for Customer A from Datacenter II 102*b* to Datacenter IV 104 and for Customer B from Datacenter II 102*b* to Datacenter V 106.

Additionally, routing of calls between services need to be configured. As both Customer A and Customer B chose the same primary locations, they are the same. That is, Customer requests are routed to Service 1 108 in Datacenter I 102*a*, which calls Service 2 110 in Datacenter I 102*a*, which calls Service 3 112 in Datacenter I 102*a* and Service 4 114 in Datacenter II 102*b*; additionally, also Service 3 112 in Datacenter I 102*a* calls Service 4 114 in Datacenter II 102*b*.

Figure 2:
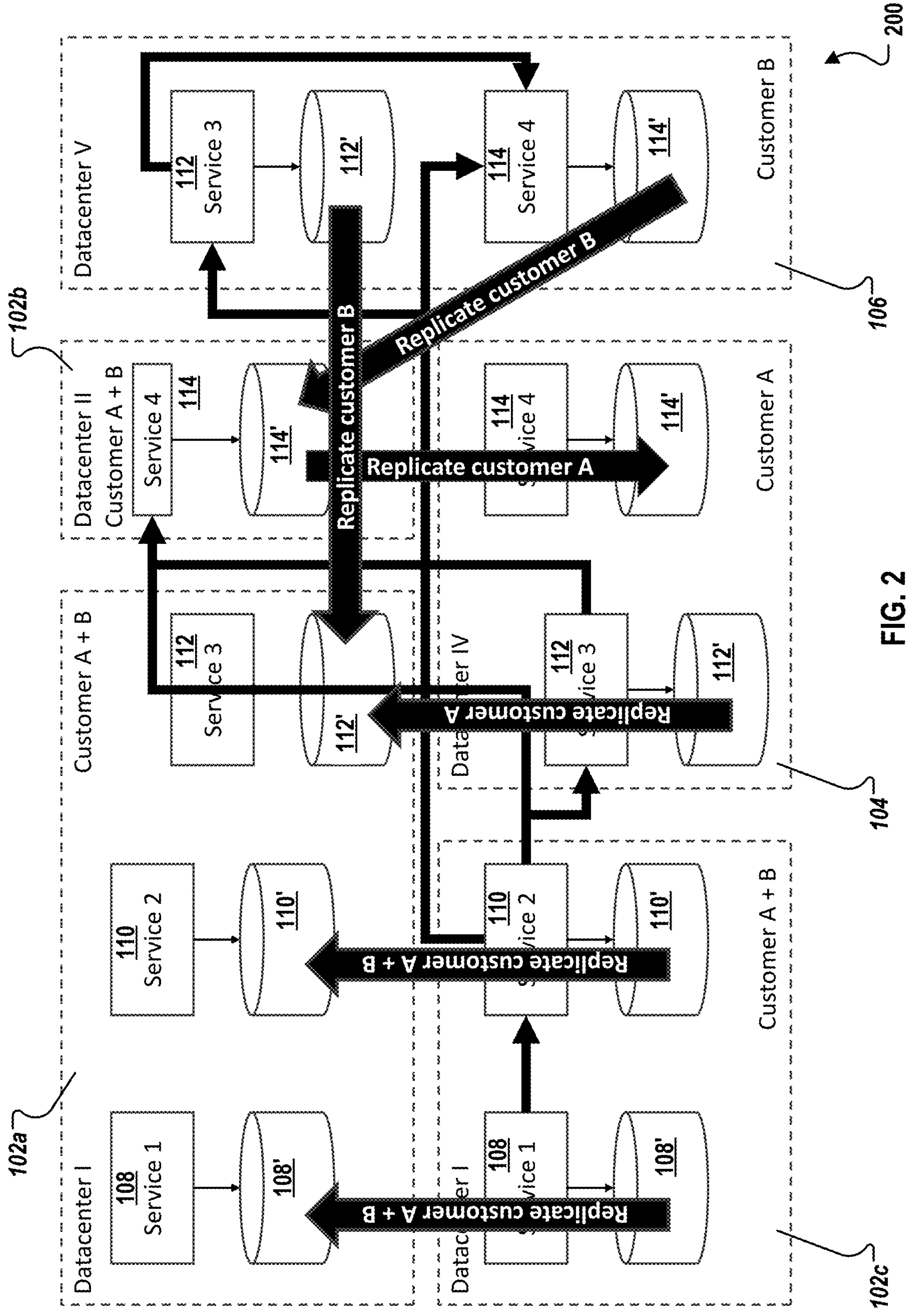
FIG. 2 is a box diagram of the example cloud computing system of FIG. 1 during a failover situation, according to an implementation of the present disclosure.

FIG. 2 is a box diagram 200 of the example cloud computing system of FIG. 1 during a failover situation, according to an implementation of the present disclosure.

In FIG. 2, assume a disaster recovery event has occurred with respect to Datacenter I 102*a* and a failover operation needs to be performed. In this case, both service request routings and persistence data replications need to be reconfigured based on customer individual choices made for the failover situation.

For data replication, in most cases only a failed primary data persistence is replaced by a corresponding secondary data persistence that is promoted to new primary data persistence and data replication is inverted. As the original data persistencies become unavailable during the outage, the original secondary data persistencies cannot replicate their data back during this phase, but either buffer all changes for a later replication or start a synchronization based on their current data when the situation is resolved. However, there may also be reasons to invert data replication between datacenters not directly affected by the outage.

In the example of FIG. 2, this is the case for Customer B using Service 4 114 that needs to switch Service 4 114 replication from Datacenter V 106 to Datacenter II 102*b*. This is different for Customer A, where the Service 4 114 replication direction remains from Datacenter II 102*b* to Datacenter IV 104. The reason for this different behavior is the failover to two different deployments of Service 3:

1) As Datacenter IV 104 is "close enough" to Datacenter II 102*b*, Service 3 112 deployed to Datacenter IV 104 can continue to use the Service 4 114 deployment in Datacenter II 102*b*, which is what applies to Customer A.
2) For Customer B, the failover of Service 3 112 happens to Datacenter V 106 and, as in this example, this datacenter is considered to be too distant from Datacenter II 102*b* (e.g., with respect to communication latency). Service 4 114 also needs to failover to Datacenter V 106, although Datacenter II 102*b*, where the primary of Service 4 114 is deployed, is not directly affected by the outage. Still, the roles of primary and secondary are switched for Service 4 114 and therefore also the replication direction is inverted. In this special case, replication continues to keep data in sync, just in the opposite direction.

In summary, the following changes to data replication are executed:

Invert data replication of Service 1 108 and Service 2 110 for Customer A and Customer B to originate from Datacenter III 102*c* to point to Datacenter I 102*a*, but put replication on hold as target Datacenter I 102*a* is not available.

Invert data replication of Service 3 112 to originate from Datacenter IV 104 for Customer A to point to Datacenter I 102*a* and Datacenter V 106 for Customer B to point to Datacenter I 102*a*, but put replication on hold as target Datacenter I 102*a* is not available.

Invert data replication of Service 4 114 for Customer B to originate from Datacenter V 106 to point to Datacenter II 102*b*, and replication continues in the new direction as target Datacenter II 102*b* is available.

Do not change data replication of Service 4 114 from Datacenter II 102*b* to Datacenter IV 104 for Customer A.

Additionally, routing needs to be adjusted to use services from secondary datacenters as defined by each customer:

Inbound requests for both Customer A and Customer B are routed to Service 1 108 in Datacenter III 102*c*, which calls Service 2 110 in Datacenter III 102*c*.

For Customer A, Service 2 110 in Datacenter III 102*c* calls Service 3 112 in Datacenter IV 104 and Service 4 114 in Datacenter II 102*b*; additionally, Service 3 112 in Datacenter IV 104 calls Service 4 114 in Datacenter II 102*b*.

For Customer B, Service 2 110 calls Service 3 112 in Datacenter V 106 and Service 4 114 in Datacenter V 106; additionally, also Service 3 112 in Datacenter V 106 calls Service 4 114 in Datacenter V 106.

With this approach, operation continues until the outage of Datacenter I 102*a* is resolved and configurations can be switched back. Data replications that were put on hold are started and flush all buffered data (or can synchronize to the latest state of the secondary data persistencies), then data replications are inverted as needed, routing is reset, and customers can resume working in the normal non-failover configuration.

Figure 3:
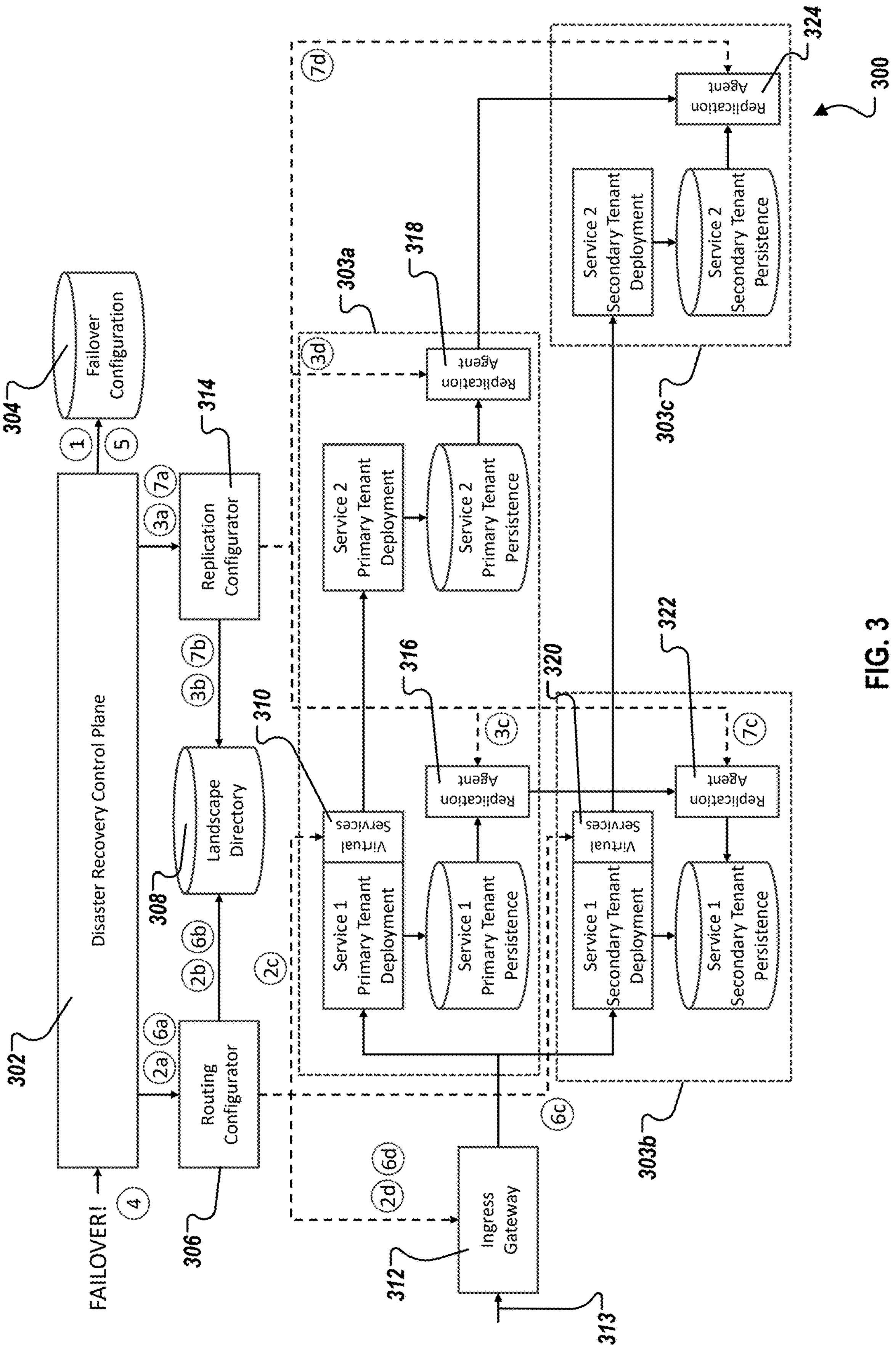
FIG. 3 is a box diagram illustrating an example of a computer-implemented system and method for tenant specific disaster recovery, according to an implementation of the present disclosure.

FIG. 3 is a box diagram illustrating an example of a computer-implemented system and method 300 for tenant specific disaster recovery, according to an implementation of the present disclosure. For clarity of presentation, the description that follows generally describes method 300 in the context of the other figures in this description. However, it will be understood that method 300 can be performed, for example, by any system, environment, software, and hardware, or a combination of systems, environments, software, and hardware, as appropriate. In some implementations, various steps of method 300 can be run in parallel, in combination, in loops, or in any order.

To permit consistent execution of all the steps described in the sample scenario with respect to FIGS. 1 and 2, considering each customer's (or tenant's) individual choices for primary and secondary locations, a central Disaster Recovery Control Plane 302 is introduced. The described steps of method 300, initial configuration (1-3) and reconfiguration (5-7), are performed for a failover for all affected tenants after an occurrence of a disaster-recovery-causing event at (4). Note that while the steps are the same for all tenants, actual configurations may be different for each tenant (i.e., tenant-specific). That is, routings and replications may be configured between different datacenters depending on how each customer has configured a primary and secondary datacenter preference (as described in the example with respect to FIGS. 1 and 2). Here, 303*a* is considered a primary datacenter and 303*b*/303*c* are considered secondary datacenters.

The Disaster Recovery Control Plane 302 is a software application hosted in a cloud-computing environment, either running redundantly in multiple datacenter locations the Disaster Recovery Control Plane 302 manages or in a different location than those that are managed. The Disaster Recovery Control Plane 302 provides two kinds of graphical-type user interface (UI) (or GUI): 1) a first for customers to configure their preferences with regard to primary and secondary datacenter per solution and 2) a second for cloud-computing operators to trigger failover procedures once a disaster-causing-event was determined.

At (1), customers configure preferences for primary and secondary datacenter locations for each of their software application solutions in the Disaster Recovery Control Plane 302. The preferences are stored as a failover configuration in a Failover Configuration persistency 304 (e.g., a database), which is a persistence to the Disaster Recovery Control Plane 302. The Failover Configuration persistency 304 stores preference selections for primary and secondary datacenters of customers for each of their solutions. From (1), method 300 proceeds to (2a)-(2d).

At (2a), the configured preferences for primary and secondary datacenter locations is translated into a routing configuration using a Routing Configurator 306 used to set up a service mesh for communication between services within and across datacenter locations. The Routing Configurator 306 configures an actual endpoint that is invoked and credentials to use when a component within a service mesh calls a service by its symbolic name. From 2a, method 300 proceeds to (2b).

At (2b), service endpoints are read from a Landscape Directory 308, which lists all services across datacenter locations with, for example, their names, types, persistencies, and deployment coordinates (e.g., uniform resource locator (URL) and credentials). The Landscape Directory 308 also allows the Routing Configurator 306 to determine services with their endpoints in the various datacenter locations and to configure the services into a service mesh. Likewise, a Replication Configurator 314 uses the Landscape Directory 308 to look up service persistencies with their endpoints in the various datacenter locations and to configure replication agents between the service persistencies.

The Replication Configurator 314 configures Replication Agents 316/318/322/324 attached to all service persistencies to replicate data written to a primary persistence to a corresponding secondary persistence. Should the secondary persistence be not accessible (e.g., after a disaster recovery event with a following replication inversion), the Replication Agents either buffer updates to their persistencies or are able to identify data that had not yet been replicated. Once the Replication Configurator 314 triggers replication start after an outage has been resolved, the Replication Agents flush their buffered data or, respectively, retrieve and send data that has not been replicated in the interim. From (2b), method 300 proceeds to (2c).

At (2c), the service endpoints are used by the Routing Configurator 306 to configure Virtual Services 310 that implement a service mesh to route service requests to service deployments in the primary datacenters of customers' choice. From (2c), method 300 proceeds to (2d).

At (2d), additionally, a global ingress is configured by the Routing Configurator 306 in an Ingress Gateway 312 to route end users' initial requests 313 into the service mesh to a first service instance in a customer preferred primary datacenter(s). From (2d), method 300 proceeds to (3a).

At (3a), data replication is configured with a Replication Configurator 314 to copy all data to redundant storage, again according to customers' preferences for primary and secondary datacenter locations. From (3a), method 300 proceeds to (3b).

At (3b), as for the routing configuration, endpoints of persistent storage replication agents are fetched from the Landscape Directory 308. From (3b), method 300 proceeds to (3c)+(3d).

At (3c)+(3d), using the fetched endpoints of persistent storage replication agents, replication agents (316+318, respectively, for (3c)+(3d)) for each service persistence in a primary datacenter are configured. The configured replication agents are used to replicate all data written for each customer tenant to a corresponding replication agent in the secondary datacenter the customer has selected. From (3c) and (3d), method 300 proceeds to (4).

At (4), it is assumed that a disaster recovery event has occurred and that a failover needs to be performed. The Disaster Recovery Control Plane 302 is triggered to orchestrate the necessary steps. From (4), method 300 proceeds to (5).

At (5), the Disaster Recovery Control Plane 302 reads the failover configuration per customer from the Failover Configuration persistency 304 and reconfigures routing and replication. From (5), method 300 proceeds to (6a).

At (6a), the failover configuration is translated into routing configurations using the Routing Configurator 306. From (6a), method 300 proceeds to (6b).

At (6b), service endpoints are read from the Landscape Directory 308. From (6b), method 300 proceeds to (6c).

At (6c), using the Routing Configurator and the read service endpoints, configure Virtual Services 320 that implement a service mesh to route service requests to service deployments in the secondary datacenters of customers' choice. From (6c), method 300 proceeds to (6d).

At (6d), additionally, a global ingress is configured using the Ingress Gateway 312 to route end users' initial requests into the service mesh to a first service instance in a preferred secondary datacenter(s). From (6d), method 300 proceeds to (7a).

At (7a), data replication is configured using the Replication Configurator 314 to copy all data to redundant storage (depending on their availability), again according to customers' preferences for primary and secondary datacenter locations. From (7a), method 300 proceeds to 7b.

At (7b), as for the routing configuration, endpoints of persistent storage replication agents are fetched by the Replication Configurator from the Landscape Directory 308. From (7b), method 300 proceeds to (7c)+(7d).

At (7c)+(7d), using the fetched endpoints of persistent storage replication agents, replication agents (322+324, respectively, for (7c)+(7d)) for each service persistence in a secondary datacenter are configured with the information to which primary datacenter replication agents should have any written replicated to, inverting replication direction for affected persistent storages. Although replication will not be performed to affected persistencies during the outage phase of the primary datacenter, the reconfigured replication agents (e.g., 322 and 324) will collect data that needs to be replicated in the secondary datacenters until they can be flushed back to their primaries once the outage is resolved. After (7c)+(7d), method 300 can stop.

Figure 4:
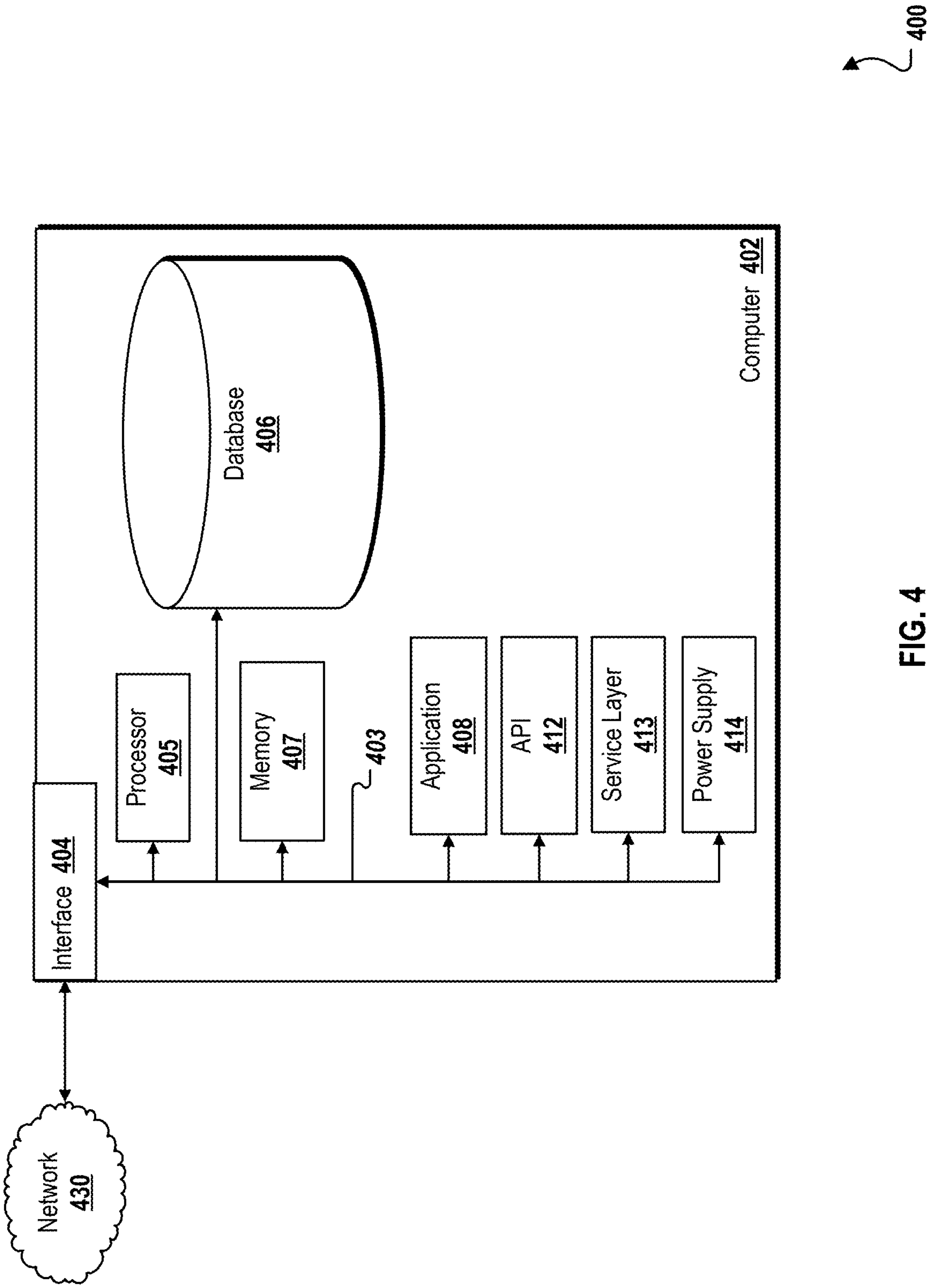
FIG. 4 is a block diagram illustrating an example of a computer-implemented system used to provide computational functionalities associated with described algorithms, methods, functions, processes, flows, and procedures, according to an implementation of the present disclosure.

FIG. 4 is a block diagram illustrating an example of a computer-implemented System 400 used to provide computational functionalities associated with described algorithms, methods, functions, processes, flows, and procedures, according to an implementation of the present disclosure. In the illustrated implementation, computer-implemented system 400 includes a Computer 402 and a Network 430.

The illustrated Computer 402 is intended to encompass any computing device, such as a server, desktop computer, laptop/notebook computer, wireless data port, smart phone, personal data assistant (PDA), tablet computer, one or more processors within these devices, or a combination of computing devices, including physical or virtual instances of the computing device, or a combination of physical or virtual instances of the computing device. Additionally, the Computer 402 can include an input device, such as a keypad, keyboard, or touch screen, or a combination of input devices that can accept user information, and an output device that conveys information associated with the operation of the Computer 402, including digital data, visual, audio, another type of information, or a combination of types of information, on a GUI or other type of UI.

The Computer 402 can serve in a role in a distributed computing system as, for example, a client, network component, a server, or a database or another persistency, or a combination of roles for performing the subject matter described in the present disclosure. The illustrated Computer 402 is communicably coupled with a Network 430. In some implementations, one or more components of the Computer 402 can be configured to operate within an environment, or a combination of environments, including cloud-computing, local, or global.

At a high level, the Computer 402 is an electronic computing device operable to receive, transmit, process, store, or manage data and information associated with the described subject matter. According to some implementations, the Computer 402 can also include or be communicably coupled with a server, such as an application server, e-mail server, web server, caching server, or streaming data server, or a combination of servers.

The Computer 402 can receive requests over Network 430 (for example, from a client software application executing on another Computer 402) and respond to the received requests by processing the received requests using a software application or a combination of software applications. In addition, requests can also be sent to the Computer 402 from internal users (for example, from a command console or by another internal access method), external or third-parties, or other entities, individuals, systems, or computers.

Each of the components of the Computer 402 can communicate using a System Bus 403. In some implementations, any or all of the components of the Computer 402, including hardware, software, or a combination of hardware and software, can interface over the System Bus 403 using an application programming interface (API) 412, a Service Layer 413, or a combination of the API 412 and Service Layer 413. The API 412 can include specifications for routines, data structures, and object classes. The API 412 can be either computer-language independent or dependent and refer to a complete interface, a single function, or even a set of APIs. The Service Layer 413 provides software services to the Computer 402 or other components (whether illustrated or not) that are communicably coupled to the Computer 402. The functionality of the Computer 402 can be accessible for all service consumers using the Service Layer 413. Software services, such as those provided by the Service Layer 413, provide reusable, defined functionalities through a defined interface. For example, the interface can be software written in a computing language (for example JAVA or C++) or a combination of computing languages, and providing data in a particular format (for example, extensible markup language (XML)) or a combination of formats. While illustrated as an integrated component of the Computer 402, alternative implementations can illustrate the API 412 or the Service Layer 413 as stand-alone components in relation to other components of the Computer 402 or other components (whether illustrated or not) that are communicably coupled to the Computer 402. Moreover, any or all parts of the API 412 or the Service Layer 413 can be implemented as a child or a sub-module of another software module, enterprise application, or hardware module without departing from the scope of the present disclosure.

The Computer 402 includes an Interface 404. Although illustrated as a single Interface 404, two or more Interfaces 404 can be used according to particular needs, desires, or particular implementations of the Computer 402. The Interface 404 is used by the Computer 402 for communicating with another computing system (whether illustrated or not) that is communicatively linked to the Network 430 in a distributed environment. Generally, the Interface 404 is operable to communicate with the Network 430 and includes logic encoded in software, hardware, or a combination of software and hardware. More specifically, the Interface 404 can include software supporting one or more communication protocols associated with communications such that the Network 430 or hardware of Interface 404 is operable to communicate physical signals within and outside of the illustrated Computer 402.

The Computer 402 includes a Processor 405. Although illustrated as a single Processor 405, two or more Processors 405 can be used according to particular needs, desires, or particular implementations of the Computer 402. Generally, the Processor 405 executes instructions and manipulates data to perform the operations of the Computer 402 and any algorithms, methods, functions, processes, flows, and procedures as described in the present disclosure.

The Computer 402 also includes a Database 406 that can hold data for the Computer 402, another component communicatively linked to the Network 430 (whether illustrated or not), or a combination of the Computer 402 and another component. For example, Database 406 can be an in-memory or conventional database storing data consistent with the present disclosure. In some implementations, Database 406 can be a combination of two or more different database types (for example, a hybrid in-memory and conventional database) according to particular needs, desires, or particular implementations of the Computer 402 and the described functionality. Although illustrated as a single Database 406, two or more databases of similar or differing types can be used according to particular needs, desires, or particular implementations of the Computer 402 and the described functionality. While Database 406 is illustrated as an integral component of the Computer 402, in alternative implementations, Database 406 can be external to the Computer 402. The Database 406 can hold and operate on at least any data type mentioned or any data type consistent with this disclosure.

The Computer 402 also includes a Memory 407 that can hold data for the Computer 402, another component or components communicatively linked to the Network 430 (whether illustrated or not), or a combination of the Computer 402 and another component. Memory 407 can store any data consistent with the present disclosure. In some implementations, Memory 407 can be a combination of two or more different types of memory (for example, a combination of semiconductor and magnetic storage) according to particular needs, desires, or particular implementations of the Computer 402 and the described functionality. Although illustrated as a single Memory 407, two or more Memories 407 or similar or differing types can be used according to particular needs, desires, or particular implementations of the Computer 402 and the described functionality. While Memory 407 is illustrated as an integral component of the Computer 402, in alternative implementations, Memory 407 can be external to the Computer 402.

The Application 408 is an algorithmic software engine providing functionality according to particular needs, desires, or particular implementations of the Computer 402, particularly with respect to functionality described in the present disclosure. For example, Application 408 can serve as one or more components, modules, or applications. Further, although illustrated as a single Application 408, the Application 408 can be implemented as multiple Applications 408 on the Computer 402. In addition, although illustrated as integral to the Computer 402, in alternative implementations, the Application 408 can be external to the Computer 402.

The Computer 402 can also include a Power Supply 414. The Power Supply 414 can include a rechargeable or non-rechargeable battery that can be configured to be either user- or non-user-replaceable. In some implementations, the Power Supply 414 can include power-conversion or management circuits (including recharging, standby, or another power management functionality). In some implementations, the Power Supply 414 can include a power plug to allow the Computer 402 to be plugged into a wall socket or another power source to, for example, power the Computer 402 or recharge a rechargeable battery.

There can be any number of Computers 402 associated with, or external to, a computer system containing Computer 402, each Computer 402 communicating over Network 430. Further, the term "client," "user," or other appropriate terminology can be used interchangeably, as appropriate, without departing from the scope of the present disclosure. Moreover, the present disclosure contemplates that many users can use one Computer 402, or that one user can use multiple computers 402.

Described implementations of the subject matter can include one or more features, alone or in combination.

For example, in a first implementation, a computer-implemented method for tenant specific disaster recovery, comprising: translating, by a Routing Configurator and into a routing configuration, tenant-specific software application solution preferences for primary and secondary datacenter locations; setting up, using the Routing Configurator, a service mesh for communication between services within and across the primary and secondary datacenter locations; configuring, using a Replication Configurator and service persistencies with endpoints in datacenter locations as determined from a Landscape Directory, replication agents between the service persistencies; configuring, using the Routing Configurator and service endpoints read from the Landscape Directory, Virtual Services that implement the service mesh, which is used to route service requests to service deployments in a tenant-selected primary datacenter; configuring, using the Routing Configurator, an Ingress Gateway to route end user requests into the service mesh to a first service instance in the tenant-selected primary datacenter; configuring, using a Replication Configurator and according to the tenant-specific software application solution preferences for primary and secondary datacenter locations, data replication to copy data to redundant storage; and configuring, using the Replication Configurator and endpoints of persistent storage replication agents fetched from the Landscape Directory for each service persistence in the tenant-selected primary datacenter, persistent storage replication agents for each service persistence in the tenant-selected primary datacenter.

The foregoing and other described implementations can each, optionally, include one or more of the following features:

A first feature, combinable with any of the following features, comprising: receiving, by a Disaster Recovery Control Plane, the tenant-specific software application solution preferences for primary and secondary datacenter locations; and storing the tenant-specific software application solution preferences for primary and secondary datacenter locations in a Failover Configuration persistency.

A second feature, combinable with any of the previous or following features, wherein the persistent storage replication agents replicate data for each tenant to a corresponding replication agent in a tenant-selected secondary datacenter.

A third feature, combinable with any of the previous or following features, comprising: following detection of a disaster recovery event, triggering the Disaster Recovery Control Plane to perform failover operations; reading, using the Disaster Recovery Control Plane and from the Failover Configuration persistency, the tenant-specific software application solution preferences for primary and secondary datacenter locations; and reconfiguring routing and replication.

A fourth feature, combinable with any of the previous or following features, comprising: translating, using the Routing Configurator and into routing configurations, the tenant-specific software application solution preferences for primary and secondary datacenter locations; and reading, from the Landscape Directory, the service endpoints.

A fifth feature, combinable with any of the previous or following features, comprising configuring, using Routing Configurator and the service endpoints, the service mesh to route service requests to service deployments in the tenant-selected secondary datacenter.

A sixth feature, combinable with any of the previous or following features, comprising configuring, using the Routing Configurator, an Ingress Gateway to route user initial requests into the service mesh to a first service instance in the tenant-selected secondary datacenter.

A seventh feature, combinable with any of the previous or following features, comprising configuring, using the Replication Configurator, data replication to copy data to redundant storage based on the tenant-specific software application solution preferences for primary and secondary datacenter locations.

An eighth feature, combinable with any of the previous or following features, comprising fetching, by the Replication Configurator and from the Landscape Directory, endpoints of the persistent storage replication agents.

A ninth feature, combinable with any of the previous or following features, comprising configuring, by the Replication Configurator and using the endpoints of the persistent storage replication agents, each service persistence in the tenant-selected secondary datacenter with information to which primary datacenter replication agents should replicate written data to.

In a second implementation, a non-transitory, computer-readable medium storing one or more instructions executable by a computer system to perform one or more operations for tenant specific disaster recovery, comprising: translating, by a Routing Configurator and into a routing configuration, tenant-specific software application solution preferences for primary and secondary datacenter locations;

setting up, using the Routing Configurator, a service mesh for communication between services within and across the primary and secondary datacenter locations; configuring, using a Replication Configurator and service persistencies with endpoints in datacenter locations as determined from a Landscape Directory, replication agents between the service persistencies; configuring, using the Routing Configurator and service endpoints read from the Landscape Directory, Virtual Services that implement the service mesh, which is used to route service requests to service deployments in a tenant-selected primary datacenter; configuring, using the Routing Configurator, an Ingress Gateway to route end user requests into the service mesh to a first service instance in the tenant-selected primary datacenter; configuring, using a Replication Configurator and according to the tenant-specific software application solution preferences for primary and secondary datacenter locations, data replication to copy data to redundant storage; and configuring, using the Replication Configurator and endpoints of persistent storage replication agents fetched from the Landscape Directory for each service persistence in the tenant-selected primary datacenter, persistent storage replication agents for each service persistence in the tenant-selected primary datacenter.

The foregoing and other described implementations can each, optionally, include one or more of the following features:

A first feature, combinable with any of the following features, comprising: receiving, by a Disaster Recovery Control Plane, the tenant-specific software application solution preferences for primary and secondary datacenter locations; and storing the tenant-specific software application solution preferences for primary and secondary datacenter locations in a Failover Configuration persistency.

A second feature, combinable with any of the previous or following features, wherein the persistent storage replication agents replicate data for each tenant to a corresponding replication agent in a tenant-selected secondary datacenter.

A third feature, combinable with any of the previous or following features, comprising: following detection of a disaster recovery event, triggering the Disaster Recovery Control Plane to perform failover operations; reading, using the Disaster Recovery Control Plane and from the Failover Configuration persistency, the tenant-specific software application solution preferences for primary and secondary datacenter locations; and reconfiguring routing and replication.

A fourth feature, combinable with any of the previous or following features, comprising: translating, using the Routing Configurator and into routing configurations, the tenant-specific software application solution preferences for primary and secondary datacenter locations; and reading, from the Landscape Directory, the service endpoints.

A fifth feature, combinable with any of the previous or following features, comprising configuring, using Routing Configurator and the service endpoints, the service mesh to route service requests to service deployments in the tenant-selected secondary datacenter.

A sixth feature, combinable with any of the previous or following features, comprising configuring, using the Routing Configurator, an Ingress Gateway to route user initial requests into the service mesh to a first service instance in the tenant-selected secondary datacenter.

A seventh feature, combinable with any of the previous or following features, comprising configuring, using the Replication Configurator, data replication to copy data to redundant storage based on the tenant-specific software application solution preferences for primary and secondary datacenter locations.

An eighth feature, combinable with any of the previous or following features, comprising fetching, by the Replication Configurator and from the Landscape Directory, endpoints of the persistent storage replication agents.

A ninth feature, combinable with any of the previous or following features, comprising configuring, by the Replication Configurator and using the endpoints of the persistent storage replication agents, each service persistence in the tenant-selected secondary datacenter with information to which primary datacenter replication agents should replicate written data to.

In a third implementation, a computer-implemented system for tenant specific disaster recovery, comprising: one or more computers; and one or more computer memory devices interoperably coupled with the one or more computers and having tangible, non-transitory, machine-readable media storing one or more instructions that, when executed by the one or more computers, perform one or more operations, comprising: translating, by a Routing Configurator and into a routing configuration, tenant-specific software application solution preferences for primary and secondary datacenter locations; setting up, using the Routing Configurator, a service mesh for communication between services within and across the primary and secondary datacenter locations; configuring, using a Replication Configurator and service persistencies with endpoints in datacenter locations as determined from a Landscape Directory, replication agents between the service persistencies; configuring, using the Routing Configurator and service endpoints read from the Landscape Directory, Virtual Services that implement the service mesh, which is used to route service requests to service deployments in a tenant-selected primary datacenter; configuring, using the Routing Configurator, an Ingress Gateway to route end user requests into the service mesh to a first service instance in the tenant-selected primary datacenter; configuring, using a Replication Configurator and according to the tenant-specific software application solution preferences for primary and secondary datacenter locations, data replication to copy data to redundant storage; and configuring, using the Replication Configurator and endpoints of persistent storage replication agents fetched from the Landscape Directory for each service persistence in the tenant-selected primary datacenter, persistent storage replication agents for each service persistence in the tenant-selected primary datacenter.

The foregoing and other described implementations can each, optionally, include one or more of the following features:

A first feature, combinable with any of the following features, comprising: receiving, by a Disaster Recovery Control Plane, the tenant-specific software application solution preferences for primary and secondary datacenter locations; and storing the tenant-specific software application solution preferences for primary and secondary datacenter locations in a Failover Configuration persistency.

A second feature, combinable with any of the previous or following features, wherein the persistent storage replication agents replicate data for each tenant to a corresponding replication agent in a tenant-selected secondary datacenter.

A third feature, combinable with any of the previous or following features, comprising: following detection of a disaster recovery event, triggering the Disaster Recovery Control Plane to perform failover operations; reading, using the Disaster Recovery Control Plane and from the Failover Configuration persistency, the tenant-specific software application solution preferences for primary and secondary datacenter locations; and reconfiguring routing and replication.

A fourth feature, combinable with any of the previous or following features, comprising: translating, using the Routing Configurator and into routing configurations, the tenant-specific software application solution preferences for primary and secondary datacenter locations; and reading, from the Landscape Directory, the service endpoints.

A fifth feature, combinable with any of the previous or following features, comprising configuring, using Routing Configurator and the service endpoints, the service mesh to route service requests to service deployments in the tenant-selected secondary datacenter.

A sixth feature, combinable with any of the previous or following features, comprising configuring, using the Routing Configurator, an Ingress Gateway to route user initial requests into the service mesh to a first service instance in the tenant-selected secondary datacenter.

A seventh feature, combinable with any of the previous or following features, comprising configuring, using the Replication Configurator, data replication to copy data to redundant storage based on the tenant-specific software application solution preferences for primary and secondary datacenter locations.

An eighth feature, combinable with any of the previous or following features, comprising fetching, by the Replication Configurator and from the Landscape Directory, endpoints of the persistent storage replication agents.

A ninth feature, combinable with any of the previous or following features, comprising configuring, by the Replication Configurator and using the endpoints of the persistent storage replication agents, each service persistence in the tenant-selected secondary datacenter with information to which primary datacenter replication agents should replicate written data to.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed. The computer storage medium is not, however, a propagated signal.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second(s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," "computing device," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special-purpose logic circuitry, for example, a central processing unit (CPU), a field-programmable gate array (FPGA), or an application-specific integrated circuit (ASIC). In some implementations, the computer or computer-implemented system or special-purpose logic circuitry (or a combination of the computer or computer-implemented system and special-purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system, for example LINUX, UNIX, WINDOWS, MAC OS, ANDROID, or IOS, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special-purpose logic circuitry, for example, a CPU, an FPGA, or an ASIC.

Computers for the execution of a computer program can be based on general or special-purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device, for example, a universal serial bus (USB) flash drive, to name just a few.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/−R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special-purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity or a multi-touch screen using capacitive or electric sensing. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface (GUI) can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11x or other protocols, all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

The separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method for tenant-specific disaster recovery, comprising:

translating, into a routing configuration, tenant-specific software application solution preferences for primary and secondary datacenter locations;

configuring, using read service endpoints, virtual services that implement a service mesh, which is used to route service requests to service deployments in a tenant-selected primary datacenter;

configuring a gateway to route end user requests into the service mesh to a first service instance in the tenant-selected primary datacenter;

configuring, according to the tenant-specific software application solution preferences for primary and secondary datacenter locations, data replication to copy data to redundant storage; and configuring, using endpoints of fetched persistent storage replication agents for each service persistence in the tenant-selected primary datacenter, persistent storage replication agents for each service persistence in the tenant-selected primary datacenter.

2. The computer-implemented method of claim 1, comprising:

receiving the tenant-specific software application solution preferences for primary and secondary datacenter locations, wherein the tenant-specific software application solution preferences for primary and secondary datacenter locations include one or more of: 1) regulatory requirements, 2) desired hosting platform, 3) hosting platform to avoid, or 4) location dependencies to achieve a lowest latency and fastest response time; and storing the tenant-specific software application solution preferences for primary and secondary datacenter locations in a persistency.

3. The computer-implemented method of claim 2, wherein the persistent storage replication agents replicate data for each tenant to a corresponding replication agent in a tenant-selected secondary datacenter.

4. The computer-implemented method of claim 3, comprising:

following detection of a disaster recovery event, triggering a Disaster Recovery Control Plane to perform failover operations;

reading the tenant-specific software application solution preferences for primary and secondary datacenter locations; and reconfiguring routing and replication.

5. The computer-implemented method of claim 4, comprising:

translating, into routing configurations, the tenant-specific software application solution preferences for primary and secondary datacenter locations; and reading the service endpoints.

6. The computer-implemented method of claim 5, comprising configuring, using the service endpoints, the service mesh to route service requests to service deployments in the tenant-selected secondary datacenter.

7. The computer-implemented method of claim 6, comprising configuring the gateway to route user initial requests into the service mesh to a first service instance in the tenant-selected secondary datacenter.

8. The computer-implemented method of claim 7, comprising fetching endpoints of the persistent storage replication agents.

9. The computer-implemented method of claim 8, comprising configuring, using the endpoints of the persistent storage replication agents, each service persistence in the tenant-selected secondary datacenter with information to which primary datacenter replication agents should replicate written data to.

10. A non-transitory, computer-readable medium storing one or more instructions executable by a computer system to perform one or more operations for tenant-specific disaster recovery, comprising:

translating, into a routing configuration, tenant-specific software application solution preferences for primary and secondary datacenter locations;

configuring, using read service endpoints, virtual services that implement a service mesh, which is used to route service requests to service deployments in a tenant-selected primary datacenter;

configuring a gateway to route end user requests into the service mesh to a first service instance in the tenant-selected primary datacenter;

configuring, according to the tenant-specific software application solution preferences for primary and secondary datacenter locations, data replication to copy data to redundant storage; and configuring, using endpoints of fetched persistent storage replication agents for each service persistence in the tenant-selected primary datacenter, persistent storage replication agents for each service persistence in the tenant-selected primary datacenter.

11. The non-transitory, computer-readable medium of claim 10, comprising:

receiving the tenant-specific software application solution preferences for primary and secondary datacenter locations, wherein the tenant-specific software application solution preferences for primary and secondary datacenter locations include one or more of: 1) regulatory requirements, 2) desired hosting platform, 3) hosting platform to avoid, or 4) location dependencies to achieve a lowest latency and fastest response time; and storing the tenant-specific software application solution preferences for primary and secondary datacenter locations in a persistency.

12. The non-transitory, computer-readable medium of claim 11, wherein the persistent storage replication agents replicate data for each tenant to a corresponding replication agent in a tenant-selected secondary datacenter.

13. The non-transitory, computer-readable medium of claim 12, comprising:

following detection of a disaster recovery event, triggering a Disaster Recovery Control Plane to perform failover operations;

reading the tenant-specific software application solution preferences for primary and secondary datacenter locations; and reconfiguring routing and replication.

14. The non-transitory, computer-readable medium of claim 13, comprising:

translating, into routing configurations, the tenant-specific software application solution preferences for primary and secondary datacenter locations; and reading the service endpoints.

15. The non-transitory, computer-readable medium of claim 14, comprising configuring, using the service endpoints, the service mesh to route service requests to service deployments in the tenant-selected secondary datacenter.

16. The non-transitory, computer-readable medium of claim 15, comprising configuring the gateway to route user initial requests into the service mesh to a first service instance in the tenant-selected secondary datacenter.

17. The non-transitory, computer-readable medium of claim 16, comprising fetching endpoints of the persistent storage replication agents.

18. A computer-implemented system for tenant-specific disaster recovery, comprising:

one or more computers; and one or more computer memory devices interoperably coupled with the one or more computers and having tangible, non-transitory, machine-readable media storing one or more instructions that, when executed by the one or more computers, perform one or more operations, comprising:

translating, into a routing configuration, tenant-specific software application solution preferences for primary and secondary datacenter locations;

configuring, using read service endpoints, virtual services that implement a service mesh, which is used to route service requests to service deployments in a tenant-selected primary datacenter;

configuring a gateway to route end user requests into the service mesh to a first service instance in the tenant-selected primary datacenter;

configuring, according to the tenant-specific software application solution preferences for primary and secondary datacenter locations, data replication to copy data to redundant storage; and configuring, using endpoints of fetched persistent storage replication agents for each service persistence in the tenant-selected primary datacenter, persistent storage replication agents for each service persistence in the tenant-selected primary datacenter.

* * * * *